(12) United States Patent
Jin (10) Patent No.: US 12,318,894 B1
(45) Date of Patent: Jun. 3, 2025

(54) RATCHET-TYPE TENSIONING DEVICE

(71) Applicant: Ningbo Xuding Rigging Co., Ltd, Zhejiang (CN)

(72) Inventor: Zhengbao Jin, Zhejiang (CN)

( * ) Notice: Subject to any disclaimer, the term of this patent is extended or adjusted under 35 U.S.C. 154(b) by 0 days.

(21) Appl. No.: 18/960,148

(22) Filed: Nov. 26, 2024

(51) Int. Cl.
  *B60P 7/00*  (2006.01)
  *B25B 25/00*  (2006.01)
  *B60P 7/08*  (2006.01)

(52) U.S. Cl.
  CPC ............. *B25B 25/00* (2013.01); *B60P 7/083* (2013.01)

(58) Field of Classification Search
  CPC ... B66D 3/02; B66D 1/04; B60P 7/083; B60P 7/0846; B25B 25/00
  See application file for complete search history.

(56) References Cited

U.S. PATENT DOCUMENTS

| | | | |
|---|---|---|---|
| 7,503,736 B1 * | 3/2009 | Chen | B60P 7/083 |
| | | | 410/100 |
| 10,160,419 B2 * | 12/2018 | Wedeking | F16H 31/002 |
| 2016/0347233 A1 * | 12/2016 | Kingery | B60P 7/0846 |
| 2019/0366885 A1 * | 12/2019 | Wilson, I | B60P 7/083 |

FOREIGN PATENT DOCUMENTS

WO   WO-2013039408 A1 *   3/2013   ............. B25B 25/00

* cited by examiner

*Primary Examiner* — Emmanuel M Marcelo
(74) *Attorney, Agent, or Firm* — Hawaii Patent Services; Nathaniel K. Fedde; Kenton N. Fedde (57) ABSTRACT

A ratchet-type tensioning device comprises a base, wherein the base is provided with a accommodating area for accommodating a webbing, and the accommodating area is provided with a winding and winding and unwinding mechanism which is used for winding and unwinding the webbing; the winding and winding and unwinding mechanism comprises a ratchet wheel with gear teeth, and the accommodating area is further provided with an operating mechanism, and the winding and winding and unwinding mechanism can be selectively locked or unlocked by the operating mechanism.

17 Claims, 10 Drawing Sheets

RATCHET-TYPE TENSIONING DEVICE

TECHNICAL FIELD

The present disclosure relates to the technical field of tensioners, in particular to a ratchet-type tensioning device.

BACKGROUND

Tensioner, as a tool that plays a securing function in the transportation, movement, shipment or storage of goods, mainly strengthens steel formwork, compresses wooden boards or fixes other goods by tensioning. Tensioner, as an important mechanical accessory, is mainly used to adjust and fix binding devices such as ropes, rope nets or straps. In the fields of cargo transportation and storage, tensioners can ensure the stability and safety of goods during transportation and prevent goods from being damaged due to shaking or collision.

The existing German patent No. DE102007020856A1 also discloses a tensioner. The check pawl and the locking pawl in this patent are usually separately disposed, and the check pawl and the locking pawl need to interact with each other to realize the separation of the check pawl from the check state, leading to the result that the operation of the tensioner is unchanged, the tensioning structure is more complicated, and the manufacturing cost is high.

Therefore, there is a need to put forward a new tensioner, which has a simple and compact structure, convenient operation and low manufacturing cost.

SUMMARY

The present disclosure provides a ratchet-type tensioning device to solve the problems mentioned in the background art.

In order to achieve the above object, the present disclosure provides a ratchet-type tensioning device, which includes a base which is provided with an accommodating area for accommodating a webbing; the accommodating area is provided with a winding and unwinding mechanism configured for winding and unwinding the webbing; the winding and unwinding mechanism comprises a ratchet wheel with gear teeth; the accommodating area is further provided with an operating mechanism, and the winding and unwinding mechanism can be selectively locked or unlocked by the operating mechanism; the operating mechanism is rotatably connected with a lever element having two opposite ends, which are respectively configured as a pressing end and an executing end, and the pressing end and the executing end form a lever with a rotation position of the lever element as a fulcrum; the executing end is provided with an elastic check claw located within a rotation radius of the ratchet wheel for preventing the ratchet wheel from rotating back; and when the pressing end is pressed, the executing end tilts, and the elastic check claw is located outside the rotation radius of the ratchet wheel.

The present disclosure further provides a ratchet-type tensioning device, which includes a base which is provided with an accommodating area for accommodating a webbing; the accommodating area is provided with a winding and unwinding mechanism configured for winding and unwinding the webbing; the winding and unwinding mechanism comprises a ratchet wheel with gear teeth; the accommodating area is further provided with an operating mechanism, and the winding and unwinding mechanism can be selectively locked or unlocked by the operating mechanism; the operating mechanism is rotatably connected with a lever element having two opposite ends, which are respectively configured as a pressing end and an executing end; the executing end is provided with an elastic check claw located within a rotation radius of the ratchet wheel, and the elastic check claw is provided with an arc-shaped part and a folded-back part; the arc-shaped part is configured for the gear teeth to slide over and push away the elastic check claw, and the folded-back part is configured for abutting against the gear teeth to prevent the ratchet wheel from rotating; and when the pressing end is pressed, the executing end tilts, and the elastic check claw is located outside the rotation radius of the ratchet wheel.

The present disclosure further provides a ratchet-type tensioning device, which includes a base which is provided with an accommodating area for accommodating a webbing; the accommodating area is provided with a winding and unwinding mechanism configured for winding and unwinding the webbing; the winding and unwinding mechanism comprises a ratchet wheel with gear teeth; the accommodating area is further provided with an operating mechanism, and the winding and unwinding mechanism can be selectively locked or unlocked by the operating mechanism; the operating mechanism is rotatably connected with a lever element having two opposite ends, which are respectively configured as a pressing end and an executing end; the executing end is provided with an elastic check claw located within a rotation radius of the ratchet wheel for preventing the ratchet wheel from rotating back; and the executing end is further provided with a locking element for locking the winding and unwinding mechanism, and the elastic check claw is fixedly installed on the locking element and extends towards the ratchet wheel.

Reference signs: Base (100); Accommodating area (101); Side wall (102); Locked position (1021); Released position (1022); Separator (1023); Operating mechanism (200); Connecting part (201); Extended end (2011); Handle (202); Winding and unwinding mechanism (300); Central shaft (301); Drum (302); Ratchet wheel (303); Gear teeth (3031); Shaft sleeve (304); Lever element (400); Pressing end (401); Executing end (402); Locking element (403); Positioning part (4031); Elastic check claw (404); Arc-shaped part (4041); Folded-back part (4042); Torsion spring (405); Webbing (500).

DESCRIPTION OF EMBODIMENTS

Figure 1:
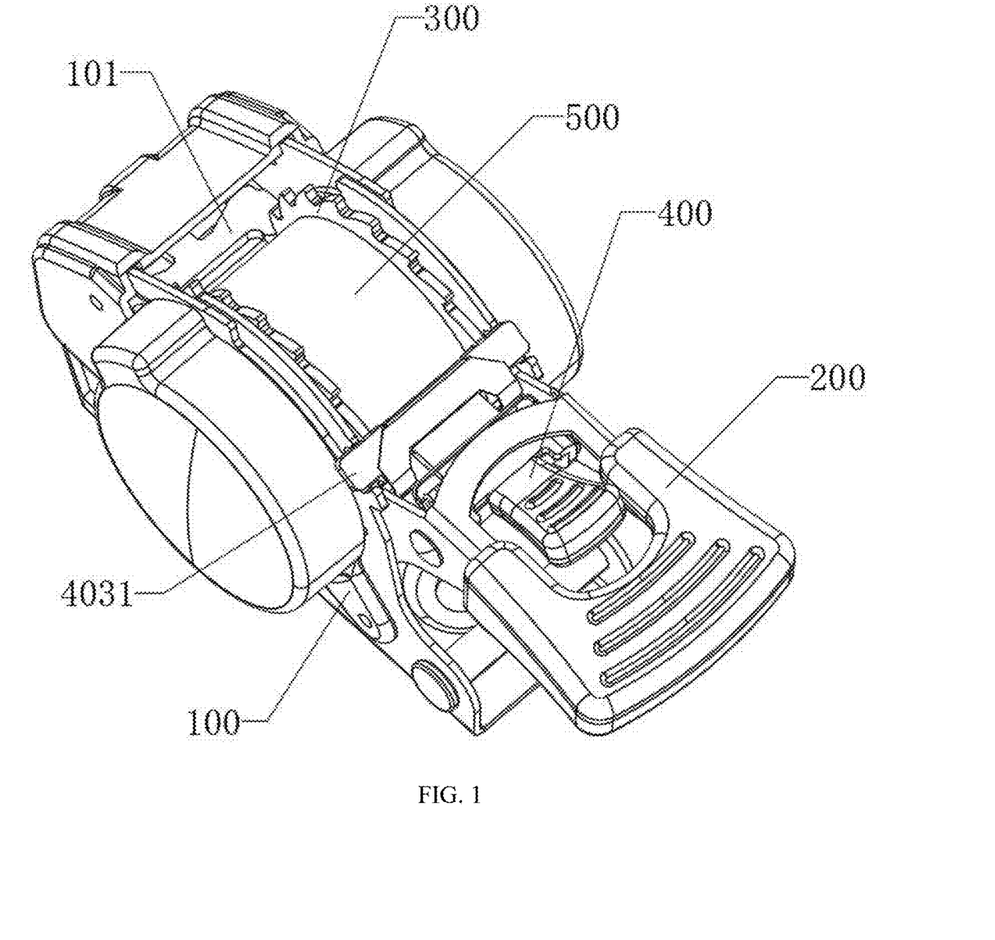
FIG. 1 is a schematic structural diagram of the present disclosure.
Figure 2:
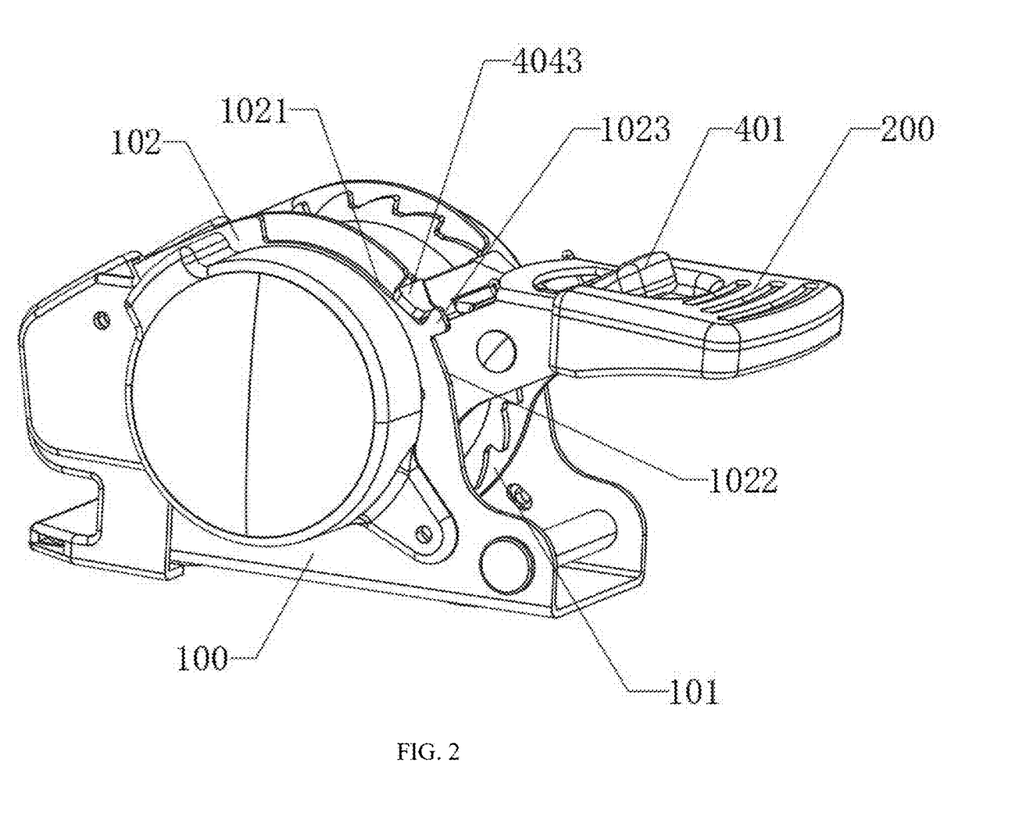
FIG. 2 is a schematic structural view from another perspective of FIG. 1.
Figure 3:
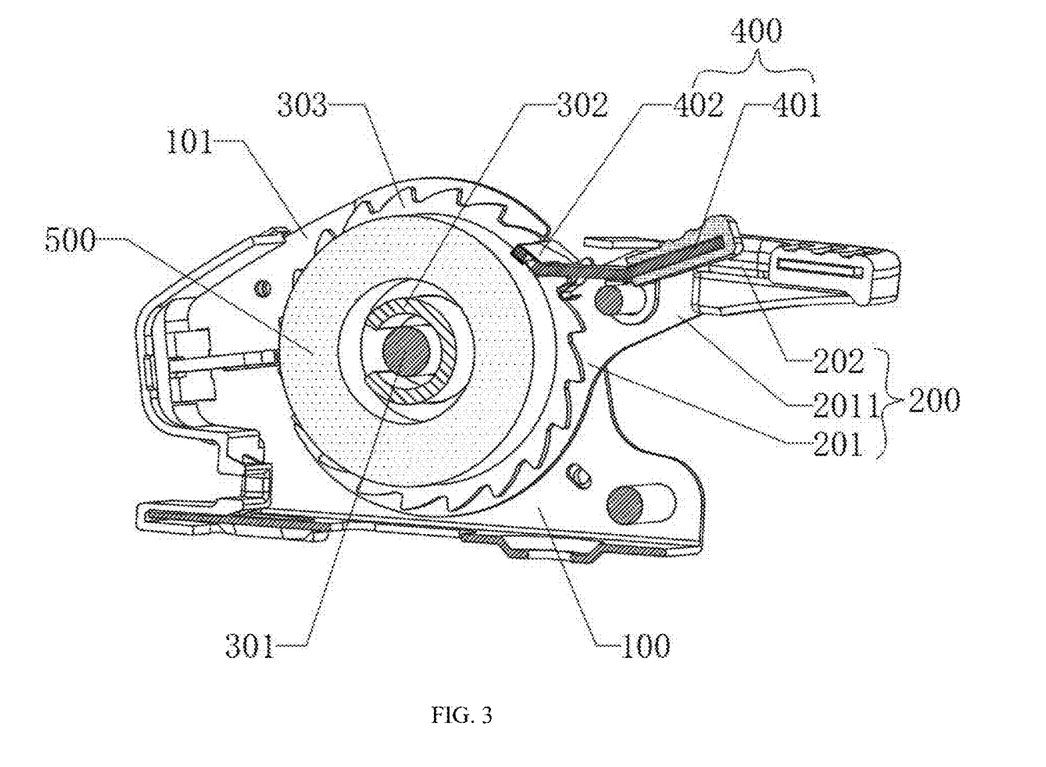
FIG. 3 is a schematic cross-sectional view of FIG. 2 in the transverse direction.

As shown in FIG. 1 to FIG. 3, the present disclosure provides a folding ratchet-type tensioning device, which includes a base 100 which is provided with an accommodating area 101 for accommodating a webbing 500, and the accommodating area 101 is provided with a winding and unwinding mechanism 300, which includes a ratchet wheel 303 with gear teeth 3031. The accommodating area 101 is further provided with an operating mechanism 200. The winding and unwinding mechanism 300 can be selectively locked or unlocked by the operating mechanism 200. The operating mechanism 200 is rotatably connected with a lever element 400, which has opposite ends that are respectively configured as a pressing end 401 and an executing end 402. The pressing end 401 and the executing end 402 form a labor-saving lever with the rotation position of the lever element 400 as a fulcrum, that is, the distance from the pressing end 401 to the fulcrum is greater than the distance from the executing end 402 to the fulcrum, so as to be easily pressed by a user in use.

Furthermore, the executing end 402 is provided with an elastic check claw 404 located within the rotation radius of the ratchet wheel 303 to prevent the ratchet wheel 303 from rotating back. When the pressing end 401 is pressed, the executing end 402 tilts up, and the elastic check claw 404 tilts up with the executing end 402. At this time, both the executing end 402 and the elastic check claw 404 are located outside the rotation radius of the ratchet wheel 303.

Figure 4:
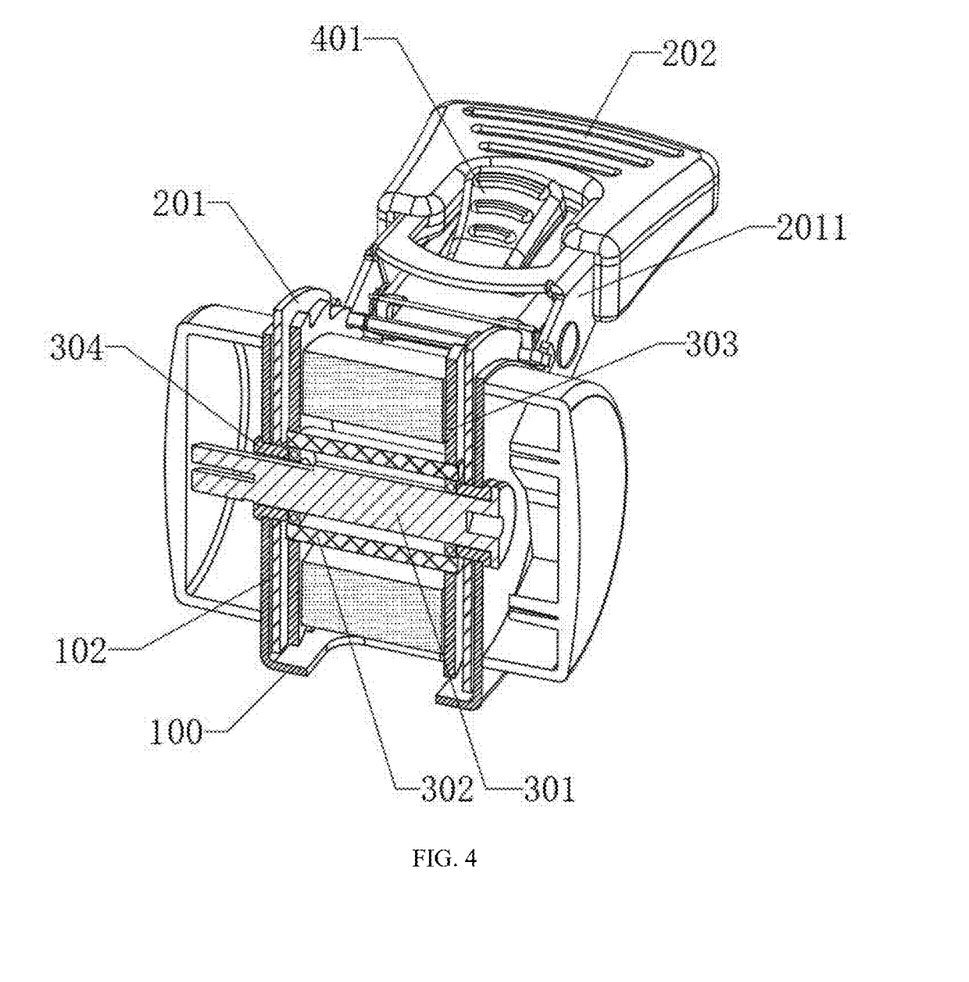
FIG. 4 is a schematic structural view of FIG. 2 in the longitudinal direction.

As shown in FIGS. 3 and 4, the winding and unwinding mechanism 300 further includes a central shaft 301 and a drum 302 for winding the webbing 500; It is worth mentioning that the winding and unwinding mechanism 300 is provided with a volute spiral spring (not shown) for automatic winding and unwinding of the winding and unwinding mechanism 300, which is a well-known technology in the field and will not be described in detail in this application. Further, the accommodating area 101 has enough space, and the central shaft 301 is installed at a suitable position to ensure the winding and unwinding of the webbing 500.

The central shaft 301 is inserted into the accommodating area 101, the drum 302 is sleeved outside the central shaft 301 and rotatably connected with the central shaft 301. The ratchet wheel 303 is sleeved outside the drum 302 and fixedly connected with the drum 302 to ensure that the ratchet wheel 303 and the drum 302 wound with the webbing 500 rotate synchronously. A shaft sleeve 304 is embedded between the central shaft 301 and the base 100, and at least part of the shaft sleeve 304 is located in the accommodating area 101.

The shaft sleeve 304 and the components sleeved on the shaft sleeve 304 are stationary relative to the central shaft 301, and the part of the shaft sleeve 304 located outside the accommodating area 101 has a larger radius, thus limiting the axial relative movement of the components on the shaft sleeve 304.

Further, bearings are disposed between the shaft sleeves 304, and the bearings can be deep groove ball bearings or cylindrical roller bearings, etc. Preferably, deep groove ball bearings are used, wherein the bearings and components sleeved on the bearings can rotate relative to the central shaft 301.

Figure 5:
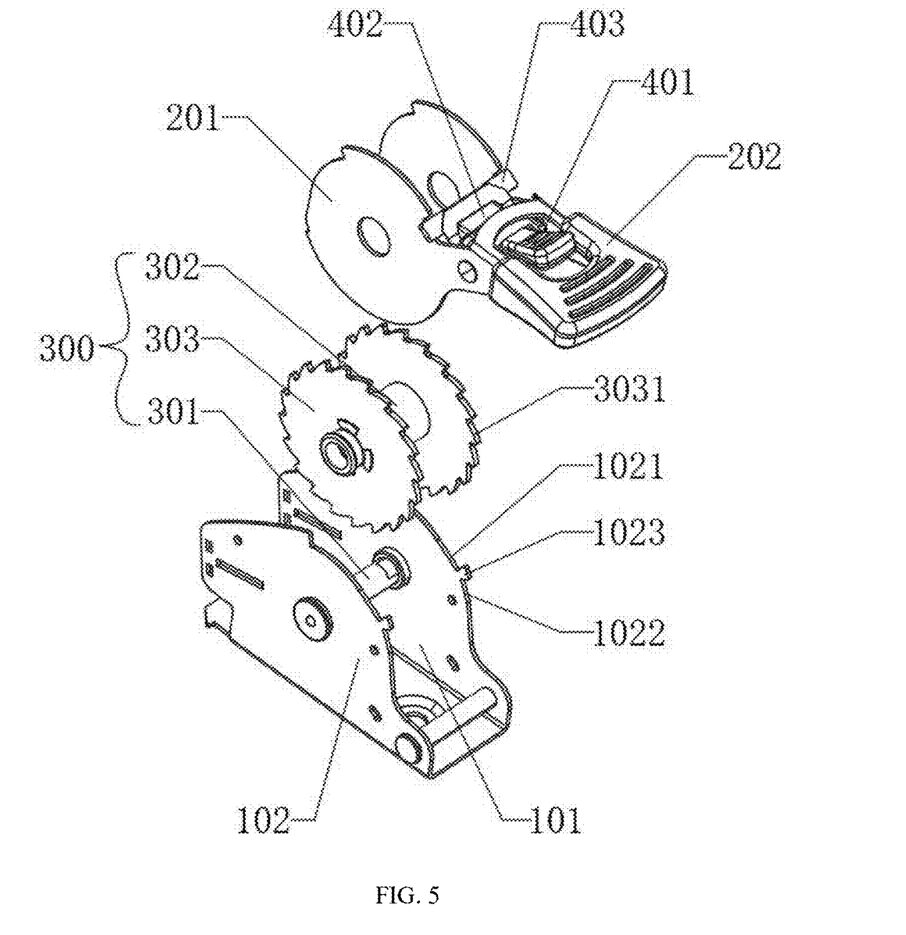
FIG. 5 is an exploded view of the present disclosure.
Figure 6:
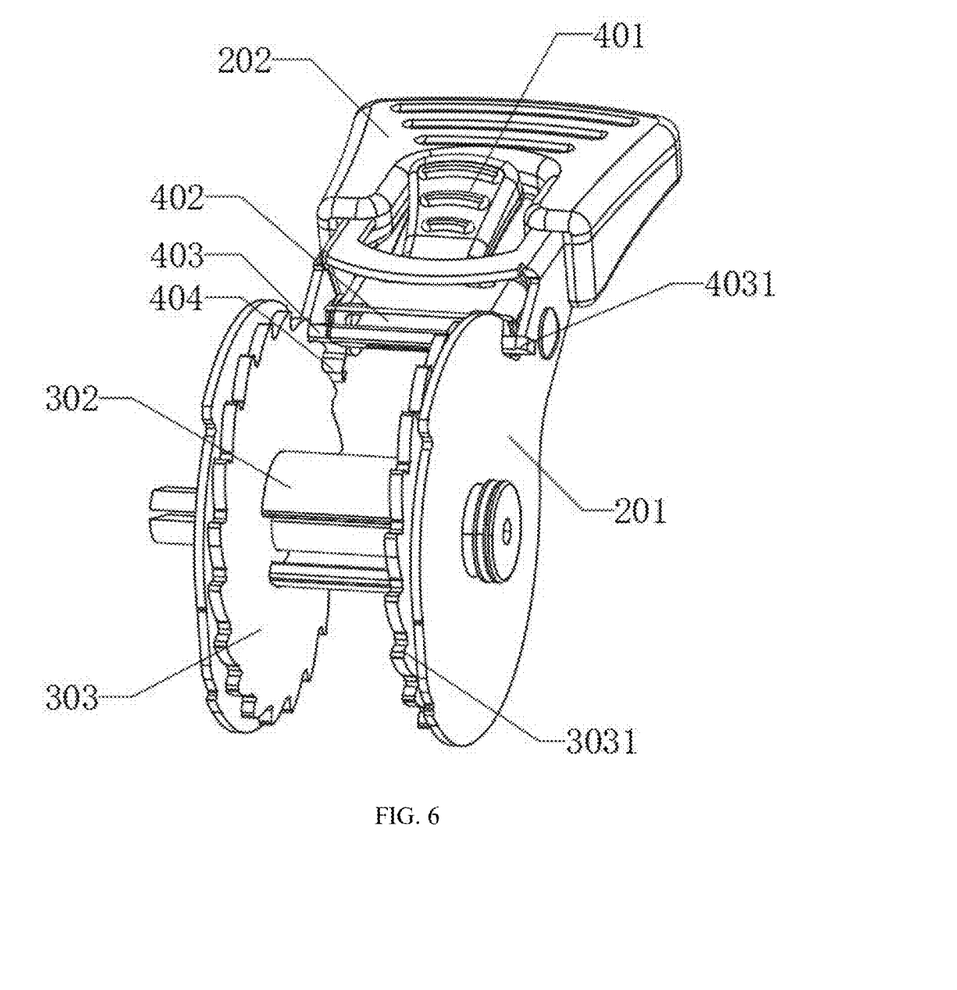
FIG. 6 is a structural schematic diagram of the operating mechanism of the present disclosure.

As shown in FIGS. 5 and 6, the operating mechanism 200 includes a connecting part 201 and a handle 202. The connecting part 201 is sleeved outside the shaft sleeve 304 and is rotatably connected with the shaft sleeve 304. The connecting part 201 has an extended end 2011 far away from the winding and unwinding mechanism 300, the handle 202 is installed on the extended end 2011, and the lever element 400 is rotatably connected at the extended end 2011. The executing end 402 is disposed towards the winding and unwinding mechanism 300. A pin shaft is disposed in the middle of the extended end 2011, and the lever element 400 is rotatably connected with the extended end 2011 through the pin shaft. A torsion spring 405 is installed on the pin shaft, and under normal conditions, the torsion spring 405 is in a natural state, thus forcing the handle 202 to be slightly higher than the extended end 2011, which is convenient for the user to press the handle 202. At the same time, the torsion spring 405 also forces the executing end 402 to abut against the outer contour of the side wall 102. When the pressing end 401 is pressed, the torsion spring 405 is in a working state, stores elastic potential energy, generates a restoring torque, and has a tendency to return to the natural state. Once the pressing end 401 is no longer stressed, the torsion spring 405 returns to the natural state.

Further, the executing end 402 is further provided with a locking element 403, and the elastic check claw 404 is fixedly installed on the locking element 403 and extends towards the ratchet wheel 303. On the other hand, the accommodating area 101 has a side wall 102, and the outer contour of the side wall 102 is provided with a locked position 1021 and a released position 1022 which are matched with the locking element 403, and a separator 1023 is disposed between the locked position 1021 and the released position 1022. A separator 1023, which is configured as a convex block, is disposed between the locked position 1021 and the released position 1022 for separating the locked position 1021 from the released position 1022.

The locked position 1021 and the released position 1022 are spaced from the winding and unwinding mechanism 300, and the spacing between the released position 1022 and the winding and unwinding mechanism 300 is greater than that between the locked position 1021 and the winding and unwinding mechanism 300, in other words, the locked position 1021 is close to the winding and unwinding mechanism 300 and located within the rotation radius of the ratchet wheel 303; The released position 1022 is far away from the winding and unwinding mechanism 300 and located outside the rotation radius of the ratchet wheel 303.

Figure 7:
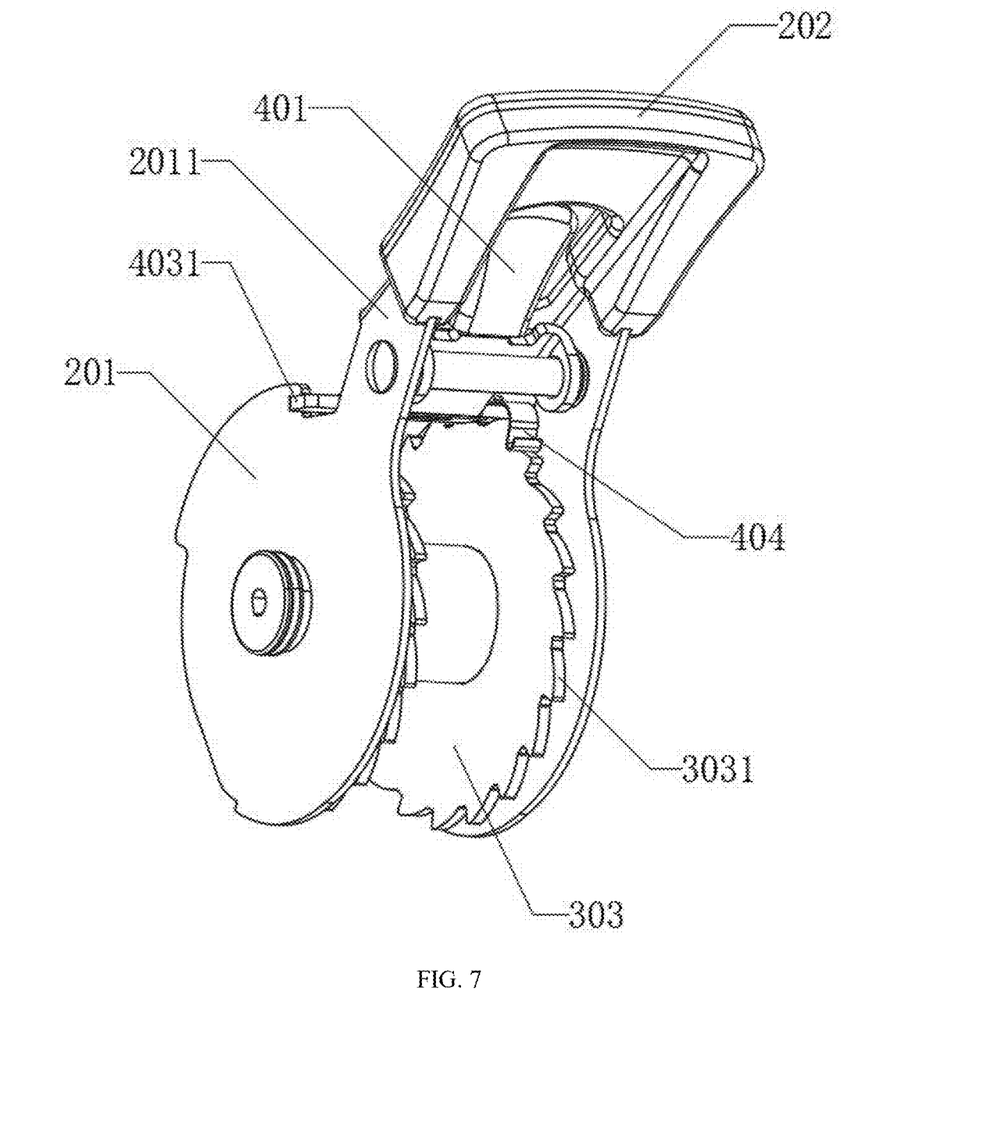
FIG. 7 is a schematic structural view from another perspective of FIG. 6.
Figure 8:
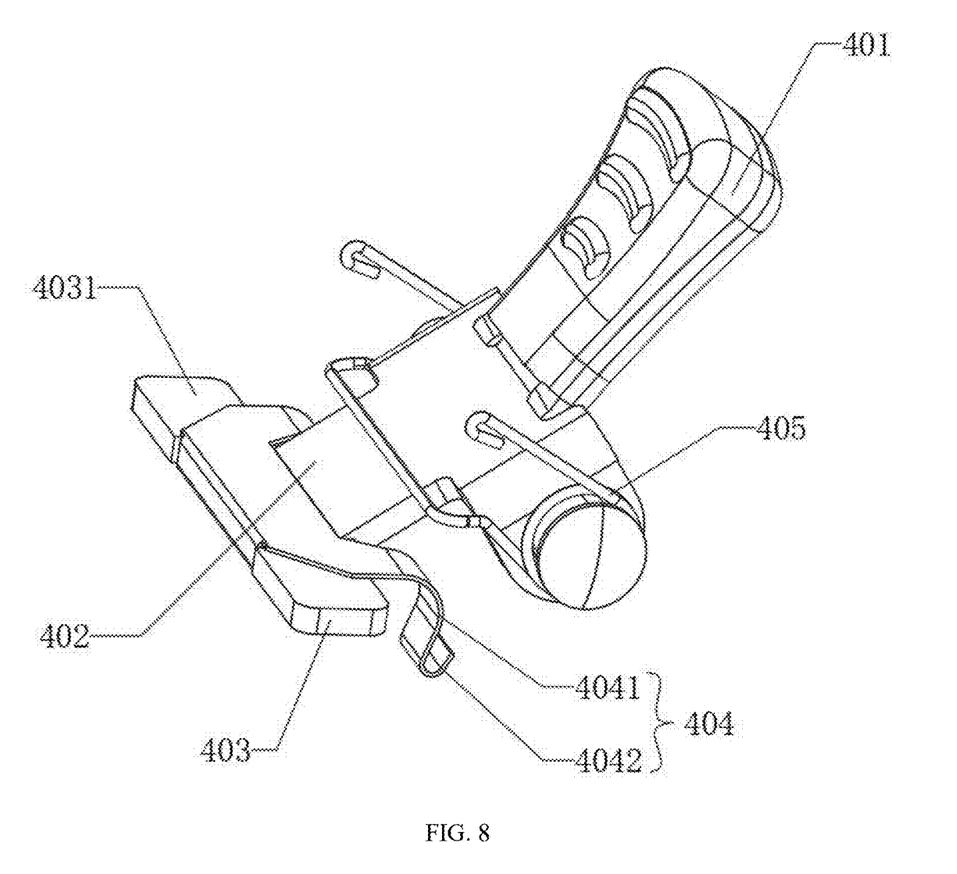
FIG. 8 is a schematic structural view of the lever component.
Figure 9:
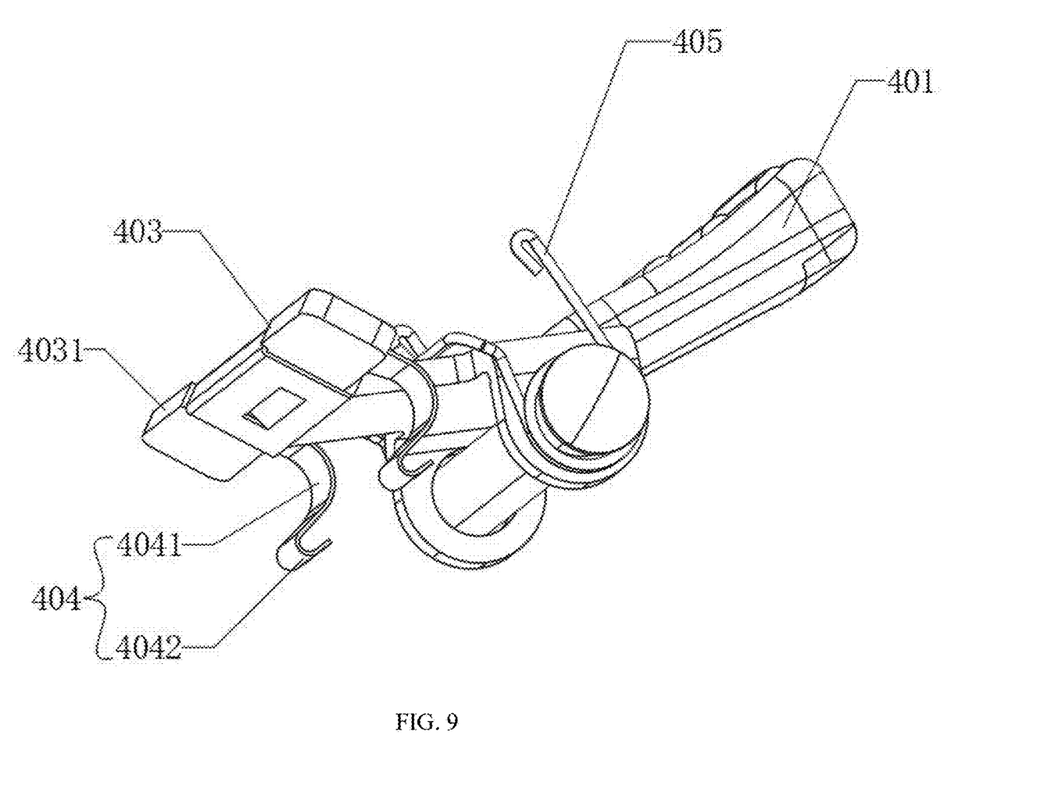
FIG. 9 is a schematic structural view from another perspective of FIG. 8.
Figure 10:
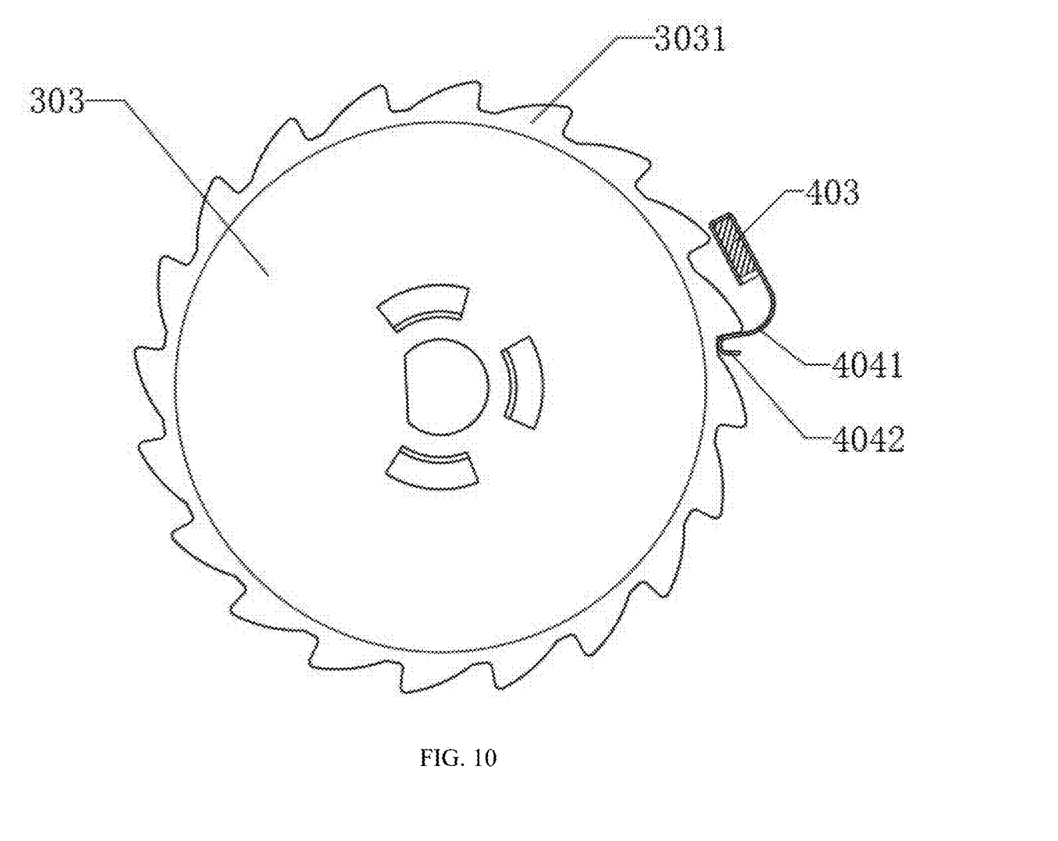
FIG. 10 is a diagram showing the mating state of the ratchet wheel and the elastic check claw of the present disclosure.

As shown in FIGS. 7 and 8, the locking element 403 is provided with a positioning part 4031, which can be selectively placed in the locked position 1021 or the released position 1022, and the locking element 403 and the elastic check claw 404 are relatively fixed. Moreover, the distance between the locking element 403 and the elastic check claw 404 matches the distance between the adjacent gear teeth 3031 on the ratchet wheel 303.

That is, when the locking part 4031 is placed at the locked position 1021, the elastic check claw 404 abuts against the gear teeth 3031, and when the positioning part 4031 is placed at the released position 1022, the elastic check claw 404 abuts against the adjacent gear teeth 3031. As such, the elastic check claw 404 abuts against the gear teeth 3031 regardless of whether the locking element 403 is placed at the locked position 1021 or the released position 1022.

Further, as shown in FIG. 2, when the positioning part 4031 is located at the locked position 1021, the locking element 403 is located within the rotation radius of the ratchet wheel 303 and is clamped between two adjacent gear teeth 3031. At the same time, the torque of the ratchet wheel 303 is transmitted to the locking element 403 through the gear teeth 3031, and is transmitted to the separator 1023 through the locking element 403, so as to block the gear teeth 3031 and limit the clockwise rotation of the ratchet wheel 303. At the same time, the elastic check claw 404 abuts against the gear teeth 3031, which limits the counterclockwise rotation of the ratchet wheel 303, thus locking the winding and unwinding mechanism 300.

When the pressing part 401 is pressed, the locking element 403 is located outside the rotation radius of the ratchet wheel 303, and at the same time, the operating mechanism 200 is toggled clockwise, so that the locking element 403 rotates to the released position 1022 far away from the winding and unwinding mechanism 300. At this time, the locking element 403 is located outside the rotation radius of the ratchet wheel 303, and the elastic check claw 404 still abuts against the gear teeth 3031, so that the ratchet wheel 303 can rotate clockwise but not counterclockwise. When the pressing part 401 is pressed and the operating mechanism 200 is rotated counterclockwise, both the locking element 403 and the elastic check claw 404 are far away from the ratchet wheel 303, at this time, the ratchet wheel 303 can rotate clockwise and counterclockwise.

Specifically, as shown in FIGS. 7 to 10, the rotation radius of the ratchet wheel 303 is defined as between the top circle radius and the root circle radius of the ratchet wheel 303. The elastic check claw 404 has an arc-shaped part 4041 and a folded-back part 4042, and the arc-shaped part 4041 has a large radius of curvature and thus has a larger elastic deformation. When the ratchet wheel rotates clockwise, the arc-shaped portion 4041 changes outward in the radial direction, and the radius of curvature increases, so that the gear teeth 3031 can slide over and push away the elastic check claw 404.

The folded-back part 4042 has a smaller radius of curvature, and thus has a smaller elastic deformation and a greater rigidity. When rotating counterclockwise, the folded-back part 4042 abuts against the gear teeth 3031. The contact surface between the gear tooth 3031 and the folded-back part 4042 gradually moves away from the tooth root to squeeze the folded-back part 4042, which in turn causes the folded-back part 4042 to deform less elastically, and at the same time makes the arc-shaped part 4041 deform radially inward. When squeezed to a certain extent, the folded-back part 4042 and the arc-shaped part 4041 have greater elastic restoring force, so as to resist the gear teeth 3031, prevent the ratchet wheel 303 and the winding and unwinding mechanism 300 from rotating back, and ensure that the winding and unwinding mechanism 300 can only rotate clockwise in the working state.

Further, in the specific use process, the pressing end 401 is pressed and the operating mechanism 200 is rotated counterclockwise with the central shaft 301 as the rotation center, so that the locking element 403 rotates to the leftmost end of the locked position 1021 and abuts against the locked position 1021. At this time, the locking element 403 is clamped at the lowest position of the gear teeth 3031 at the same time, and the elastic check claw 404 tilts up without being subjected to any stress. The pressing end 401 is pressed, and the operating mechanism 200 is rotated clockwise with the central shaft 301 as the rotation center. The elastic check claw 404 can easily jump over the gear teeth 3031 and return to the initial position of the locked position 1021. Due to the action of the coil spring, the webbing 500 tends to retract in this process, but the check device limits the retraction of the webbing 500, and when the operating mechanism 200 is rotated clockwise, the webbing 500 can be tightened.

The pressing end 401 is pressed and the operating mechanism 200 is further rotated counterclockwise, so that the locking element 403 is clamped to the released position 1022. At the same time, the webbing 500 returns to the relaxed state from the tightened state. The pressing end 401 is pressed again, so that the locking element 403 and the elastic check claw 404 tilt up and are located outside the rotation radius of the ratchet wheel 303. Under the action of the coil spring, the webbing 500 is smoothly retracted. Because the present disclosure also has a safety device, the device will not be damaged due to the too fast retraction speed.

The function of the elastic check claw 404 is further explained. When the locking element 403 is in the released position 1022, only the elastic check claw 404 is located in the rotation radius of the ratchet wheel 303. When the webbing 500 is pulled out, the gear teeth 3031 can easily break the block of the arc-shaped part 4041, so that the webbing 500 can be pulled out easily. When it stops pulling the webbing 500, the ratchet wheel 303 will rotate counterclockwise under the action of the coil spring. At this time, the surface of the gear tooth 3031 contacts the folded-back part 4042 and presses the folded-back part 4042. Because the folded-back part 4042 generates elastic deformation and stores elastic potential energy, the restoring moment of the clockwise rotation of the folded-back part 4042 is finally balanced with the restoring moment of the counterclockwise rotation of the coil spring, and the gear teeth 3031 will not rotate back.

In other possible embodiments of the elastic check claw 404 (not shown), the elastic check claw 404 can also be in the shape of a straight sheet. With the elastic check claw 404 in the shape of a straight sheet, when the ratchet wheel 303 rotates clockwise, the gear teeth 3031 can slide over the elastic check claw 404 more smoothly. However, the straight-sheet elastic check claw 404 is more suitable for scenes with less load because its check force is smaller.

In other possible embodiments of the elastic check claw 404 (not shown), the elastic check claw 404 can also be in the shape of the outer contour of the gear teeth 3031, in which case, the elastic check claw 404 is relatively parallel to the gear teeth 3031. Specifically, a straight sheet part parallel to the straight part of the gear tooth 3031 is separated from the gear tooth 3031 by a small distance, while the concave arc part parallel to the curved part of the gear teeth 3031 is separated from the gear teeth 3031 by a smaller distance. When the ratchet wheel 303 rotates counterclockwise, the elastic check claw 404 is elastically deformed, and since the contours thereof are almost the same, the contact area between the elastic check claw 404 and the gear teeth 3031 is larger, so that the elastic check claw 404 can bear greater rotary torque. Because the elastic check claw 404 is more difficult to deform, the check effect of the ratchet wheel 303 is more obvious when the winding and unwinding mechanism 300 is not pulled by an external force. When the external force pulls the webbing 500, the ratchet wheel 303 has a tendency to rotate clockwise, so that the elastic check claw 404 can be easily isolated from the gear teeth 3031, which causes the rotary torque of the elastic check claw 404 to be easily destroyed, thereby the gear teeth 3031 can smoothly pass through the elastic check claw 404, allowing the winding and unwinding mechanism 300 to rotate clockwise.

What is claimed is:

1. A ratchet-type tensioning device, comprising a base which is provided with an accommodating area for accommodating a webbing, wherein
the accommodating area is provided with a winding and unwinding mechanism configured for winding and unwinding the webbing;
the winding and unwinding mechanism comprises a ratchet wheel with gear teeth;
the accommodating area is further provided with an operating mechanism, and the winding and unwinding mechanism can be selectively locked or unlocked by the operating mechanism;
the operating mechanism is rotatably connected with a lever element having two opposite ends, which are respectively configured as a pressing end and an executing end, and the pressing end and the executing end form a lever with a rotation position of the lever element as a fulcrum;
the executing end is provided with an elastic check claw located within a rotation radius of the ratchet wheel for preventing the ratchet wheel from rotating back;
ratchet-type tensioning device is configured such that when the pressing end is pressed, the executing end tilts, and the elastic check claw is located outside the rotation radius of the ratchet wheel;
the winding and unwinding mechanism further comprises a central shaft and a drum for winding the webbing; the central shaft is inserted into the accommodating area, and the drum is sleeved outside the central shaft and rotatably connected with the central shaft; and
a shaft sleeve is embedded between the central shaft and the base, and at least part of the shaft sleeve is located in the accommodating area.

2. The ratchet-type tensioning device according to claim 1, wherein the ratchet wheel is sleeved outside the drum and fixedly connected with the drum.

3. The ratchet-type tensioning device according to claim 1, wherein the operating mechanism comprises a connecting part and a handle, and the connecting part is sleeved outside the shaft sleeve and rotatably connected with the shaft sleeve.

4. The ratchet-type tensioning device according to claim 3, wherein the connecting part has an extended end far away from the winding and unwinding mechanism, and the handle is installed on the extended end.

5. The ratchet-type tensioning device according to claim 4, wherein the lever element is rotatably connected at the extended end, and the executing end is disposed towards the winding and unwinding mechanism.

6. The ratchet-type tensioning device according to claim 5, wherein the lever element is rotatably connected with the extended end through a pin shaft, and a torsion spring is installed on the pin shaft.

7. The ratchet-type tensioning device according to claim 5, wherein the executing end is further provided with a locking element, and the elastic check claw is fixedly installed on the locking element and extends towards the ratchet wheel.

8. The ratchet-type tensioning device according to claim 7, wherein the accommodating area has a side wall, and a locked position and a released position are disposed on an outer contour of the side wall; a separator is disposed between the locked position and the released position for separating the locked position from the released position.

9. The ratchet-type tensioning device according to claim 8, wherein the locked position and the released position are spaced from the winding and unwinding mechanism, and a spacing between the released position and the winding and unwinding mechanism is greater than that between the locked position and the winding and unwinding mechanism.

10. The ratchet-type tensioning device according to claim 9, wherein the locking element is provided with a positioning part, which can be selectively placed in the locked position or the released position.

11. The ratchet-type tensioning device according to claim 10, wherein the ratchet-type tensioning device is configured such that when the positioning part is at the locked position, the locking element is located within the rotation radius of the ratchet wheel and blocks the gear teeth; when the positioning part is at the released position, the locking element is located outside the rotation radius of the ratchet wheel.

12. A ratchet-type tensioning device, comprising a base which is provided with an accommodating area for accommodating a webbing, wherein
the accommodating area is provided with a winding and unwinding mechanism configured for winding and unwinding the webbing;
the winding and unwinding mechanism comprises a ratchet wheel with gear teeth;
the accommodating area is further provided with an operating mechanism, and the winding and unwinding mechanism can be selectively locked or unlocked by the operating mechanism;
the operating mechanism is rotatably connected with a lever element having two opposite ends, which are respectively configured as a pressing end and an executing end;
the executing end is provided with an elastic check claw located within a rotation radius of the ratchet wheel, and the elastic check claw is provided with an arc-shaped part and a folded-back part;
the arc-shaped part is configured for the gear teeth to slide over and push away the elastic check claw, and the folded-back part is configured for abutting against the gear teeth to prevent the ratchet wheel from rotating;
the ratchet-type tensioning device is configured such that when the pressing end is pressed, the executing end tilts, and the elastic check claw is located outside the rotation radius of the ratchet wheel; and
the executing end is further provided with a locking element, and the elastic check claw is fixedly installed on the locking element and extends towards the ratchet wheel.

13. The ratchet-type tensioning device according to claim 12, wherein the arc-shaped part is bent away from the gear teeth, and a tip of the gear teeth is in contact with a surface of the arc-shaped part; the folded-back part abuts on an outer arc surface of the gear teeth.

14. A ratchet-type tensioning device, comprising a base which is provided with an accommodating area for accommodating a webbing, wherein
the accommodating area is provided with a winding and unwinding mechanism configured for winding and unwinding the webbing;
the winding and unwinding mechanism comprises a ratchet wheel with gear teeth;
the accommodating area is further provided with an operating mechanism, and the winding and unwinding mechanism can be selectively locked or unlocked by the operating mechanism;

the operating mechanism is rotatably connected with a lever element having two opposite ends, which are respectively configured as a pressing end and an executing end;

the executing end is provided with an elastic check claw located within a rotation radius of the ratchet wheel for preventing the ratchet wheel from rotating back; and the executing end is further provided with a locking element for locking the winding and unwinding mechanism, and the elastic check claw is fixedly installed on the locking element and extends towards the ratchet wheel.

15. The ratchet-type tensioning device according to claim 14, wherein the accommodating area has a side wall, and a locked position and a released position are disposed on the outer contour of the side wall; a separator is provided between the locked position and the released position for separating the locked position from the released position.

16. The ratchet-type tensioning device according to claim 15, wherein the locking element is provided with a positioning part which can be selectively placed in the locked position or the released position.

17. The ratchet-type tensioning device according to claim 16, wherein the ratchet-type tensioning device is configured such that when the positioning part is in the locked position, the locking element is located within the rotation radius of the ratchet wheel and blocks the gear teeth; when the positioning part is in the released position, the locking element is located outside the rotation radius of the ratchet wheel.

* * * * *